(12) United States Patent
Perkins

(10) Patent No.: US 7,639,237 B2
(45) Date of Patent: Dec. 29, 2009

(54) ROLL-OUT TOUCH SCREEN SUPPORT SYSTEM (ROTS3)

(76) Inventor: Michael T. Perkins, 902 McPhaul St., Austin, TX (US) 78758

( * ) Notice: Subject to any disclaimer, the term of this patent is extended or adjusted under 35 U.S.C. 154(b) by 581 days.

(21) Appl. No.: 11/368,047

(22) Filed: Mar. 3, 2006

(65) Prior Publication Data
US 2007/0211036 A1   Sep. 13, 2007

(51) Int. Cl.
H04B 1/38   (2006.01)
(52) U.S. Cl. .................. 345/168; 345/156; 345/166; 345/173; 345/175
(58) Field of Classification Search .................. 345/45, 345/156, 166, 168, 173, 175, 204, 905
See application file for complete search history.

(56) References Cited

U.S. PATENT DOCUMENTS

| | | | |
|---|---|---|---|
| 3,668,337 A | 6/1972 | Sinclair | |
| 3,764,486 A | 10/1973 | Tinklenberg | |
| 4,017,697 A | 4/1977 | Larson | |
| 4,017,848 A | 4/1977 | Tannas | |
| 4,431,882 A | 2/1984 | Frame | |
| 4,574,438 A | 3/1986 | Diepers | |
| 4,700,025 A | 10/1987 | Hatayama | |
| 4,786,767 A | 11/1988 | Kuhlman | |
| 4,864,084 A | 9/1989 | Cardinale | |
| 4,965,421 A | 10/1990 | Epperson | |
| 5,128,662 A * | 7/1992 | Failla | 345/1.3 |
| 5,253,338 A * | 10/1993 | Tanaka | 345/629 |
| 5,761,460 A * | 6/1998 | Santos et al. | 710/305 |
| 6,005,767 A | 12/1999 | Ku | |
| 6,506,616 B1 | 1/2003 | Kim | |
| 6,524,884 B1 | 2/2003 | Kim | |
| 6,528,951 B2 | 3/2003 | Yamazaki | |
| 6,587,096 B2 | 7/2003 | Bullister | |
| 6,734,842 B2 | 5/2004 | Woodmansee | |
| 6,850,226 B2 | 2/2005 | Finke-Anlauff | |
| 6,876,143 B2 * | 4/2005 | Daniels | 313/504 |
| 6,879,317 B2 | 4/2005 | Quinn | |
| 6,882,336 B2 | 4/2005 | Lahr | |
| 6,894,661 B1 | 5/2005 | Tuh | |
| 6,903,927 B2 | 6/2005 | Anlauff | |
| 6,909,424 B2 | 6/2005 | Liebenon | |
| 6,909,597 B2 | 6/2005 | Tutikawia | |
| 6,924,789 B2 | 8/2005 | Bick | |
| 6,952,414 B1 | 10/2005 | Willig | |
| 6,958,905 B2 | 10/2005 | Hong | |
| 6,965,374 B2 | 11/2005 | Villet | |
| 6,970,157 B2 | 11/2005 | Siddeeq | |
| 6,983,175 B2 | 1/2006 | Kwon | |
| 6,985,136 B2 | 1/2006 | Enmei | |

(Continued)

*Primary Examiner*—Bipin Shalwala
*Assistant Examiner*—Vince E Kovalick
(74) *Attorney, Agent, or Firm*—Michael T. Perkins

(57) ABSTRACT

A method for providing interactive self-supporting screen with scalable flexibility. Such a support combined with a flexible computer screen enables reliable touch, writing, mobile drawing, accurate selection, and virtual typing without requiring desk or table space. A flexible screen when rolled up will provide a reduced footprint device for storage or transport and the selective deployment to the required size as the operator desires. Consisting of Protective layer (Flexible-paper feel surface, can be touch enabled), Organic Light Emitting Display (OLED) layer, back light layer (if required), Backing (flexible, slat seam filling; blotter feel), Slats or slabs (Curtin or blinds like), and pullout, telescoping, or swing out cantilever supports.

24 Claims, 11 Drawing Sheets

U.S. PATENT DOCUMENTS

| | | |
|---|---|---|
| 6,989,984 B2 | 1/2006 | Sutton |
| 6,992,882 B2 | 1/2006 | Wang |
| 7,143,355 B2 * | 11/2006 | Yamaguchi et al. .......... 715/733 |
| 7,209,035 B2 * | 4/2007 | Tabankin et al. ....... 340/539.11 |
| 7,324,093 B1 * | 1/2008 | Gettemy et al. ............. 345/173 |
| 2002/0084990 A1 | 7/2002 | Peterson |
| 2003/0011573 A1 | 1/2003 | Villet |
| 2003/0048256 A1 * | 3/2003 | Salmon ....................... 345/168 |
| 2003/0050019 A1 * | 3/2003 | Dowling et al. ............... 455/90 |
| 2003/0090468 A1 | 5/2003 | Finke-Anlauff |
| 2004/0025396 A1 * | 2/2004 | Schlierbach et al. .......... 42/119 |
| 2004/0041800 A1 * | 3/2004 | Daniels ....................... 345/204 |
| 2004/0125085 A1 | 7/2004 | Kotzin |
| 2004/0145572 A1 | 7/2004 | Cheng |
| 2004/0246684 A1 | 12/2004 | Karaki |
| 2005/0086479 A1 * | 4/2005 | Ondet et al. ................. 713/172 |
| 2006/0202974 A1 * | 9/2006 | Thielman .................... 345/175 |
| 2006/0258291 A1 * | 11/2006 | Nakata et al. ............ 455/67.11 |

\* cited by examiner

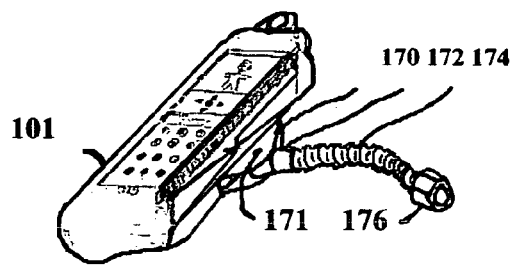
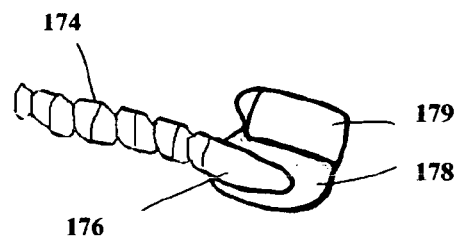
Fig 10a                Fig 10b
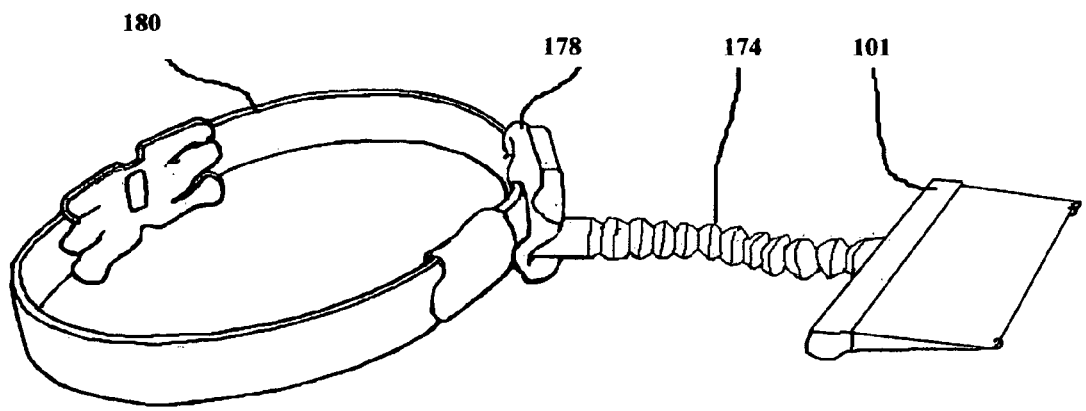
Fig 10c

ROLL-OUT TOUCH SCREEN SUPPORT SYSTEM (ROTS3)

FEDERALLY SPONSORED RESEARCH

Not Applicable

SEQUENCE LISTING OR PROGRAM

Not Applicable

BACKGROUND

1. Field of Invention

This invention relates to the field of computer, specifically to an improved computer input method.

2. Description of Prior Art

Initially computer design implementations were temperature and humidity sensitive and as such were constrained to environmentally controlled spaces. Inputs for computers began with crude and indirect devices such as switch panels, basic enunciators and paper tape. As input and support technologies have evolved terminals have moved into rooms, desks and with wireless networks; outdoors. Inputs have evolved with mice, voice, touch panels, and color. Further advances combining radio transmitters and receivers with digital signal encoding allow devices to communicate as if they are physically connected.

Touch Panels (either glass, membrane, capacity, resistive, optical or radio frequency) over Liquid Crystal Displays are the most natural human-computer input; a replacement for the clipboard as it was. Touch Panel such as U.S. Pat. No. 5,062,198, authored by Sun, titled; "Method of making a transparent touch screen switch assembly" dtd, November 1991. In Sun's disclosure small diameter polymer particles provide a spacer for separating layers of a touch screen, reducing bulk in a touch screen and allowing rolling up of screens.

Additional panels, for reference, are further discussed in Examples of switch assemblies having membrane touch panels are disclosed in the following U.S. Pat. Nos. 3,617,666; 3,668,337; 3,722,086, 3,798,370; 3,911,215; 4,017,697, 4,431,882; 4,471,177; 4,700,025 4,786,767; 4,818,827; 4,864,084

Many alternative methods are discussed for the implementation of "viral paper". The goal is to provide writing and drawing surface as much like paper as possible and capture these data with the ability to be saved and changed. Of particular importance is the ability to import information and add to or subtract from while mobile.

Existing Liquid Crystal Displays, Plasma and similar technologies configured as computer displays (e.g. computer tablets and Personal Digital Assistants) perform their jobs well; a display surface for written word, drawings, pictures. These devices can be backlit, reflective and transflective technologies enable such displays to be operated in the dark or direct sun light. These technologies suffer from their bulky nature, high weight, and high power consumption and tend to be fragile.

Many of the negative screen characteristics mentioned above are corrected through the technology developed by Tang and VanSlyke, Organic Electroluminescent Diodes, Eastman Kodak, July 1987. Screens designed with this technology using flexible sheets for display screens, instead of rigid types (glass) are considerably less bulky, much lower weight, power and less fragile.

Methods of manufacturing for Organic Light Emitting Diodes (OLED) displays is discussed by Yamazaki in U.S. Pat. No. 6,528,951 discloses an OLED with temperature stable design for consistent light levels. Kim presents in U.S. Pat No. 6,524,884 additional fabrications approaches. Kim also discloses in U.S. Pat. No. 6,506,616 additional techniques for construction of OLED displays.

The most amazing capability of this OLED technology allows a screen to be "rolled up" as a window shade and with a computer connection can be rolled out to act as full color display. This technology also has excellent viewing properties and consumes much less power then LCD, Plasma or Electro-luminescence panels. Designers of OLED technology systems envisioned a world where OLED screens would be rolled into housings that contained the computer systems, batteries and communications. Additionally, these OLED screens would be rolled out where needed to be read like a reusable newspaper. When intensive review and comments are required screens would be placed on available surfaces for discussions, comments, highlighting, and so forth.

This makes perfect sense but falls short in many mobile applications where no such surface is available.

Moreover, when a touch screen (flexible) or radio located or infrared located technology is combined with an OLED the power of the touch (selection, drawing, writing and typing (virtual)) cannot be exploited without a flexible, configurable support system

Objects and Advantages

Accordingly, besides the objects and advantages of the Roll Out Touch Screen Support System (ROTS3) process described in my above patent, several objects and advantages of the present invention are:

(a) Mobile operator interface without a need for auxiliary support;

(b) Improved commenting and note taking for mobile operators;

(c) Deployable and scalable display (telescoping) for specific tasks;

(d) Compact footprint for transportation when not in use;

(e) Advanced functions available within approximate size of a personal digital assistant or cell phone;

(f) Facilitate a rotate-able display as in landscape or portrait display formats;

(g) Efficient power usage and long battery life;

(h) Supports peripherals such as camera, speakers, microphone and others;

(i) Compliments other technologies such as PDAs, cell phones, and wearable computers for additional benefits of convenience and functionality.

SUMMARY

In accordance with the present invention, Roll Out Touch Screen Support System (ROTS3), features a configurable support system for comfortable writing, drawing, typing, and selection for any application from paper to a computer display. Specifically, an OLED screen combined with a touch panel (either flexible membrane, radio frequency (RF), or optical technologies can be used) in a ROTS3 offer a satisfying and complete computer interaction for operators without the necessity of auxiliary support. A screen is considered rollable in the sense of the present invention when the screen can be wrapped around an armature or spring loaded mechanism and pulled out, away from the armature for viewing and interacting and subsequently stored by rewrapping screen around armature.

Accordingly, several objects and advantages of this invention are the flexibility (size may be selected by operator as needed and stowed with a minimal foot print when not required), support and feel for user convenience and comfort for the operator. Types of support for flexible screens can be as simple as a plastic backing, swing or slide out support, to a seamless, reinforced support mechanism. Additional layers may be added for protection in hostile environments, backlighting for low light applications, tear-off screens for issuing receipts or tickets, any operation where an operator interacts and on multiple size input or outputs. Touch screen technologies weather capacitive, resistive, RF, or optical will when combined with flexible screen technologies and the present screen support system will facilitate dramatic improvements in mobile task performance. Still further objects and advantages will become from a study of the descriptions and drawings.

A particular application yielding additional combining wearable computers such as U.S. Pat. No. 6,137,675, Perkins, dtd. November 2000 produces advances allowing wearers to perform without any support facilities or even desks, tables or physical supports. The subject matter of which is hereby incorporated by reference in it's entirety into this disclosure.

DRAWINGS

Drawing Figures

FIG. 10A is a perspective view of a flexible arm attached to a Roll Out Touch Screen Support System.

FIG. 10B is a perspective view of a flexible support arm attached to a support to be belt mounted.

FIG. 10C is a perspective view of a Roll Out-Touch Screen Support System, flexible arm, and belt.

REFERENCE NUMERALS IN DRAWINGS

| Number | Description |
|---|---|
| 101 | Protective Housing |
| 103 | Slot, (housing 101) |
| 104 | N/A |
| 105 | Arm, Screen Support (R) |
| 106 | Arm, Screen Support (L) |
| 107 | Screen, Roll out |
| 108 | Pull Handle (Roll out screen) |
| 108L | Handle 108 left end |
| 108R | Handle 108 right end |
| 109 | Auxiliary View Port |
| 110 | Camera |
| 111 | Display Picture |
| 112 | Speakers (X 2) |
| 113 | Navigation, control (soft) |
| 114 | Microphone |
| 115 | Enunciator, (soft) |
| 116 | N/A |
| 117 | Virtual keypad |
| 119 | N/A |
| 121 | N/A |
| 123 | Hinges, Support (R) |
| 123S | Position sensor |
| 125 | Hinges, Support (L) |
| 127 | Position Lock slot (R) |
| 129 | Position Lock, slot (L) |
| 131 | N/A |
| 133 | Mechanism, Roll up |
| 133R | Retainer Tube |
| 133S | Screen-Mounting Slot |
| 134 | Hole, Support idler |
| 135 | Slot, Rectangular Tensioner |
| 136 | N/A |
| 137 | Spring, Tensioner |
| 138 | Spring Retainer |
| 139 | Support Pin |
| 140 | Battery |
| 141 | Power Supply |
| 143 | USB/1394 Interface |
| 145 | I/O Panel (Connectors) |
| 147 | Radio Interface |
| 149 | Processor Module |
| 149D | Touch Screen Digitizer |
| 149M | Memory Module |
| 151 | OLED Display Driver |
| 153 | Screen Support Mechanism |
| 154 | Operator's Hand |
| 155 | Slats (Screen support) |
| 157 | Scrimshaw (Backing) |
| 158 | Attachment Points (X 2) |
| 159 | Strap, Compensator (L + R) |
| 161 | Under-liner |
| 163 | Backlight |
| 165 | OLED Screen |
| 167 | Touch Screen |
| 169 | Protective Cover |
| 170 | Adapter Mounting Cup |
| 171 | Pin |
| 172 | Arm Adapter |
| 174 | Flexible Arm |
| 176 | Arm Adapter |
| 178 | Belt Adapter Base |
| 179 | Battery Mount |
| 179B | Battery |
| 180 | Belt |
| 182 | Operator |
| 184 | System Bus |
| 186 | Antenna |
| 188 | Indicator Dotted Line |
| 190 | Space for device 192 |
| 192 | Cell or PDA Device |

-continued

| Number | Description |
|---|---|
| 194 | Data Cable |
| 196 | Video Cable |
| 198 | Power Cable |

DETAILED DESCRIPTION

Figure 1:
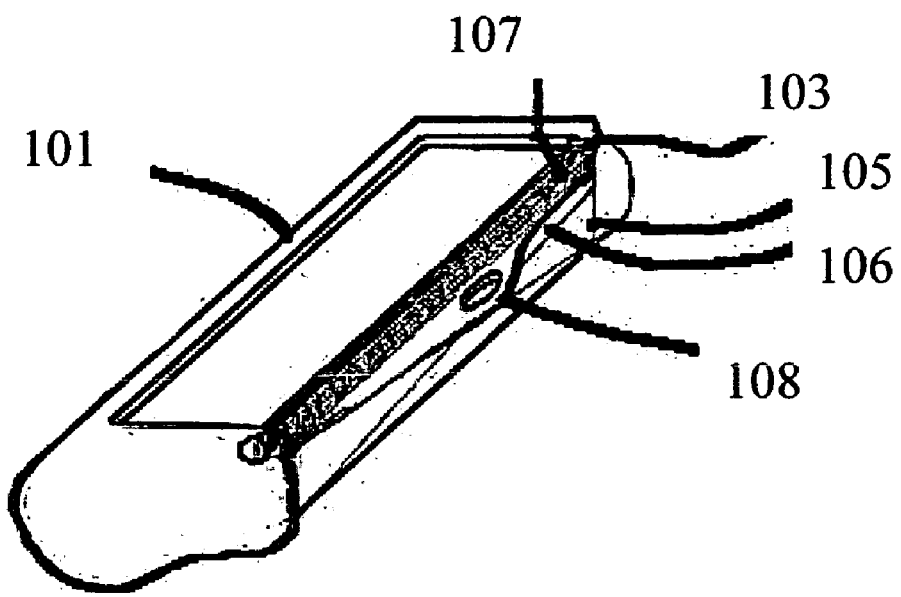
FIG. 1 is a perspective drawing of a Roll Out Touch Screen Support System.

FIG. 1 is a perspective drawing of a Roll Out Touch Screen Support System housing in accordance with this invention, showing the front, side and base of the housing. Shown in this basic configuration a protective housing 101 contains the roll out screens and support electronics. Housing 101 has a slot 103 (shown under screen 107) that runs the length of housing 101 to facilitate the screen deployment and stowing. A support Arm 105 (right) and a support arm 106 (left) are shown folded in and when deployed will provide support when swung out for a roll out screen 107. A pull handle 108 is provided to enable deployment of screen 107.

Figure 2:
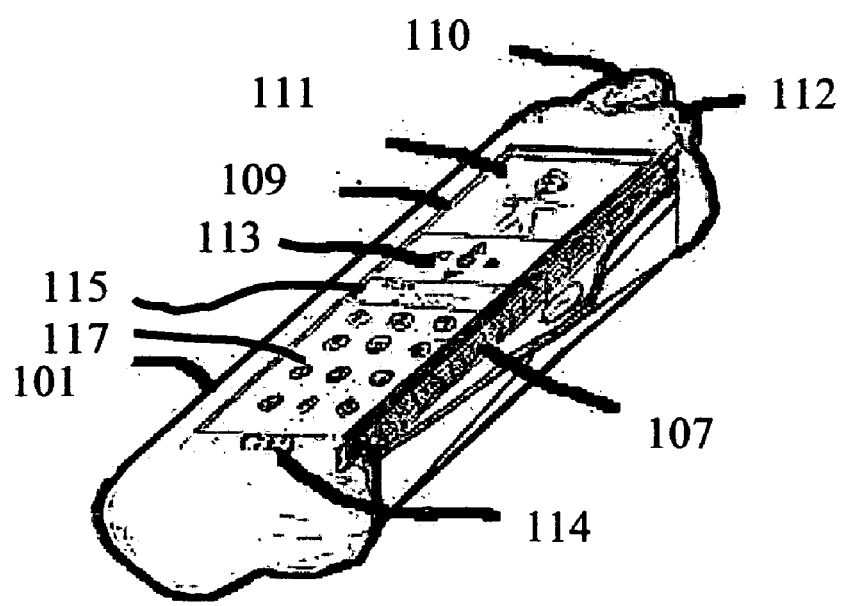
FIG. 2 is a typical configuration and mounting of a Roll Out Touch Screen Support System.

FIG. 2 is a perspective drawing of a Roll Out Touch Screen Support System housing in accordance with this invention, including a typical configuration and mounting. Housing 101 has added to it devices as might typically be included in a rolled up (screen not deployed) application. Specifically, an auxiliary view-port 109 allows viewing of a portion of screen 107 when stowed inside housing 101. This allows display of a picture 111 (such as in teleconferencing), an area for virtual (soft control) navigation 113 (for web browsing and data navigation), an area for an enunciator list 115 (i.e. notes, to do list etc.), an area for a virtual keypad 117 (dialing, data entry, etc.). Additional functions include a camera 110, a set of speakers 112 (one or more, left and right), and a microphone 114. In this view a Roll Out Touch Screen Support System presents the operator with a functional collection of devices for mobile computing.

Figure 3:
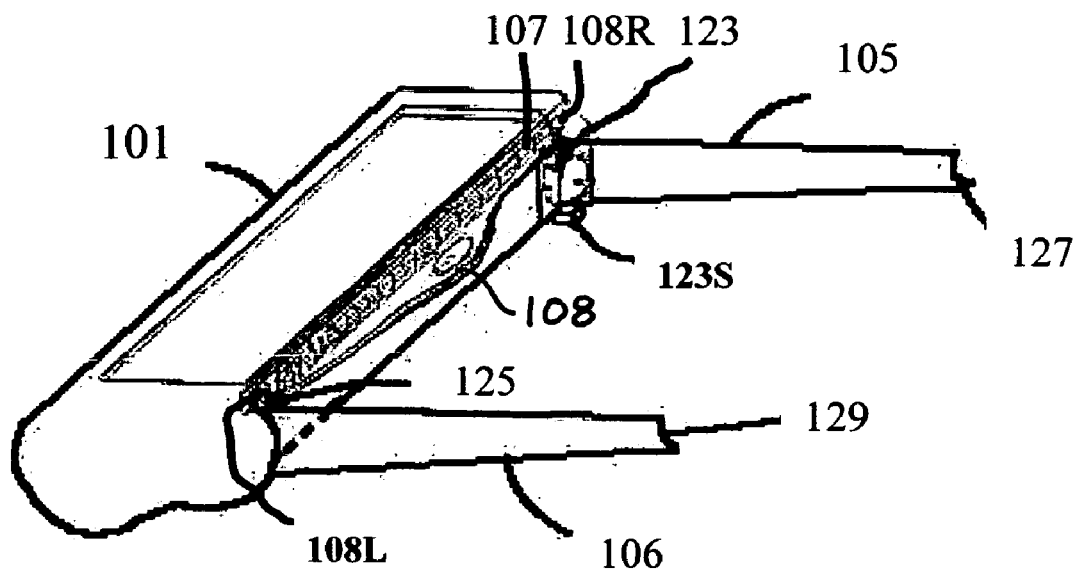
FIG. 3 is shown with support arms open on a Roll Out Touch Screen Support System.

FIG. 3 is a perspective drawing of a Roll Out Touch Screen Support System housing in accordance with this invention, with touch screen support arms open. Housing 101 is shown with support arms 105 and 106 telescoped out or deployed revealing a support hinge 123 (right) and support hinge 125 (left). In this configuration the roll out screen 107 will be supported by arms 105 and 106 when deployed. Position locking slot 127 (right) and position locking slot 129 (left) are provided to secure screen 107 by capturing handle 108 with a handle end 108L (left) and handle end 108R (right). Arms 105 and 106 can be rotated to desired opening and secure screen at selected viewing size. A simple cam follower arrangement can be used to synchronize deploying arms 105 and 106 with handle 108 enabling a single motion to deploy screen 107 and telescope arms 105 and 106. A rotary potentiometer sensor 123S such as P12426CT from www.digikey.com is mounted below hinge 123 to inform an OLED display driver 151 (FIG. 6A), how large to make screen viewing area As an example if arm 105 is folded in against housing 101 sensor 123S reads 0 and driver 151 will only illuminate the area of viewport 109 (FIG. 2) or minimum. Video drive flexibility will allow screen to be configured as PDA, cell phone (with soft keys) or as operator requires. Returning to FIG. 3, when arm 105 is partially extended sensor 123S reads 50% value and display driver 151 illuminates ½ or medium display on screen 107. When arm 105 is fully telescoped out sensor 123S reads 100% of value and display driver 151 illuminates entire display on screen 107 (as in FIG. 4) or maximum. As in FIG. 2 driver 151 will allow operator to select and customize display functions as required by tasks or needs of operator.

Figure 4:
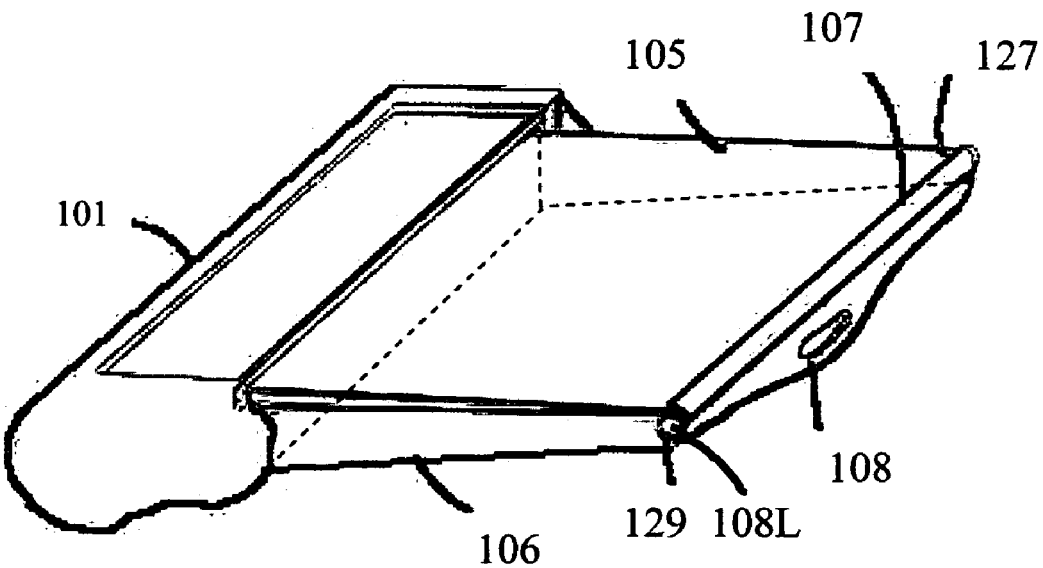
FIG. 4 is an OLED screen on a Roll Out Touch Screen Support System.

FIG. 4 is a perspective drawing of a Roll Out Touch Screen Support System housing in accordance with this invention, where arms 105 (shown below screen 107) and 106 are open and screen 107 is extended for use. Housing 101 is shown with screen 107 deployed out over arm 106 with handle 108 and end 108L holding screen 107 in slot 129 (not visible is end 108R is secured in slot 127). Handle 108 is shown held in position by slots 127 and 129.

Figure 5:
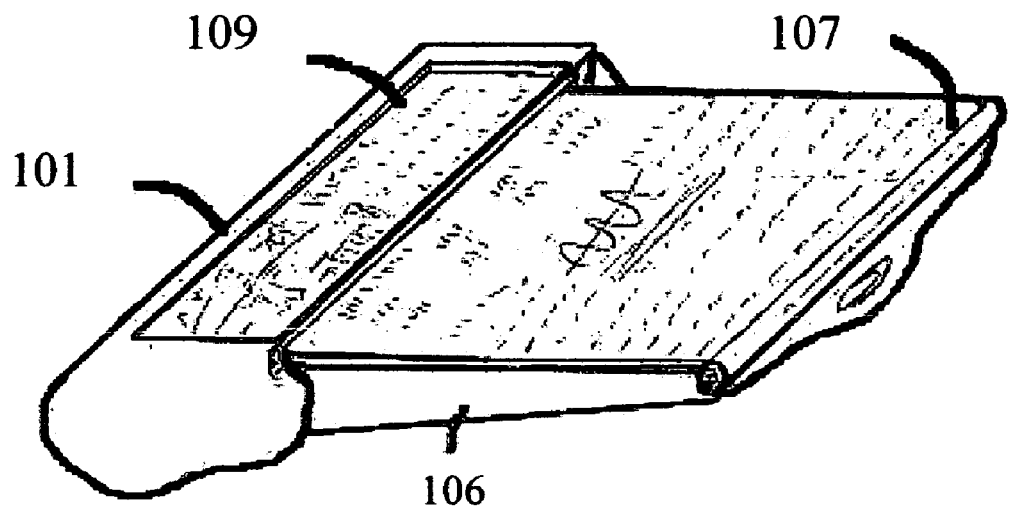
FIG. 5 is a Roll Out Touch Screen Support System where view is rotated.
Figure 8A:
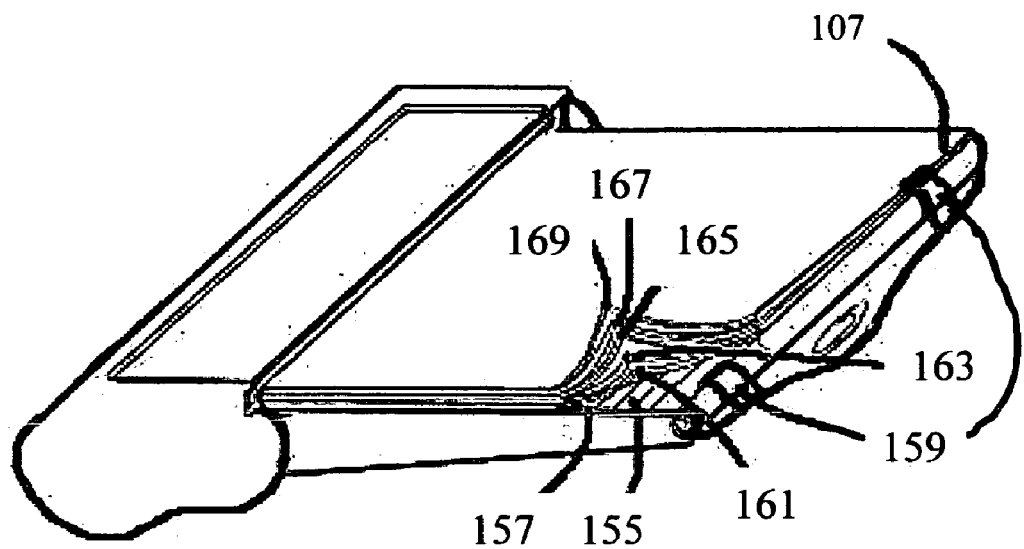
FIG. 8A is a perspective drawing of screen layers for a Roll Out Touch Screen Support System.
Figure 8B:
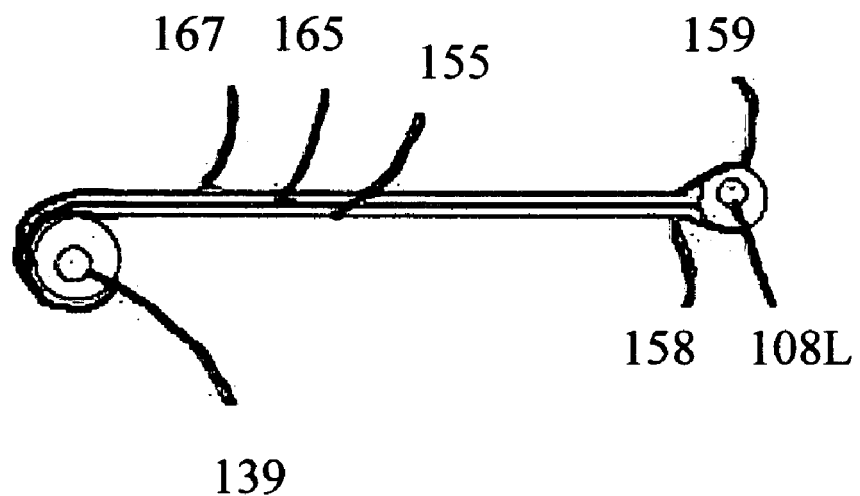
FIG. 8B is a side view of the screen roll up compensation system for a Roll Out Touch Screen Support System.

FIG. 5 is a perspective drawing of a Roll Out Touch Screen Support System housing in accordance with this invention, with touch screen support arms open and OLED screen and touch panel extended and rotated for alternative orientation. Housing 101 is shown with arm 106 extended and displaying a greek'ing (pseudo characters, not meant to be read, merely indicators) as in FIG. 4 with 90-degree rotation of screen 107 characters. This feature, provided by most video driver chip sets (typically called landscape; while a portrait configuration is default), allows greater flexibility and adaptation to various tasks. A soft-key arrangement located within viewport 109 will enable operators to select and assign video driver to viewing orientation (landscape or portrait) and arrangement or function to best facilitate task support. In this illustration view port 109 and screen 107 greek'ing in display are reassigned as for such as chart monitoring. Additionally, driver 151 (FIG. 6A) will allow deployed screen 107 to be viewed as a keyboard and data may be entered through touching virtual keys with a touch screen 167 (FIGS. 8A and 8B). Returning to FIG. 5 screen 107 may be configured as a drawing review, correction, updating device allowing field personal to display and review complete drawings in the field for remote input and updating. Further, driver 151 will allow information displayed on screen 107 to be rotated for personal viewing or collaborating with others, such as in the field where differences in "as built" structures and drawing specifics discussions.

Figure 6A:
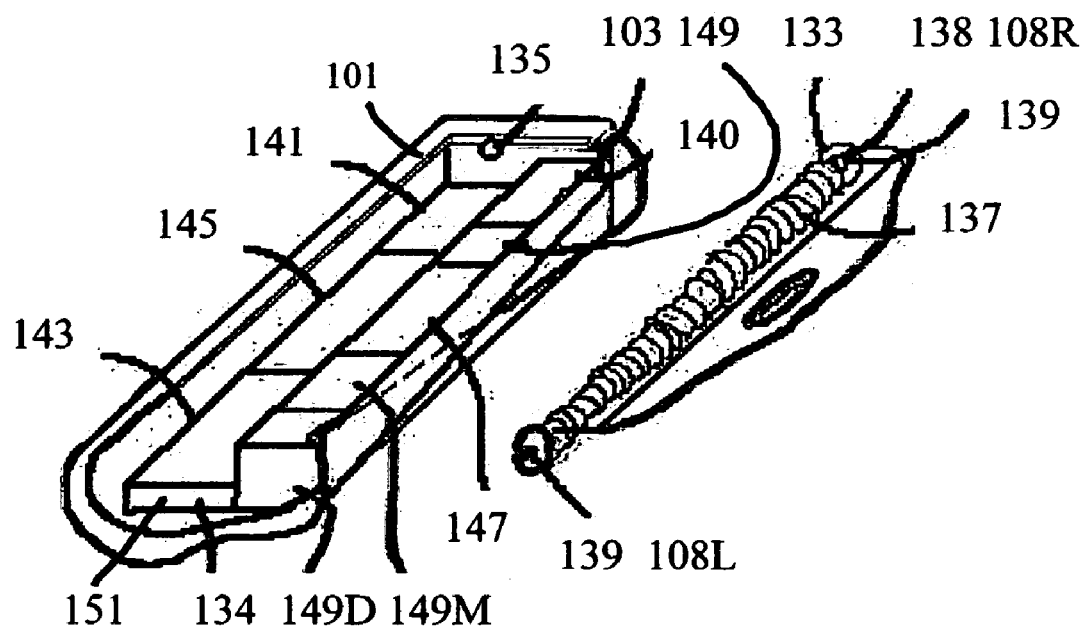
FIG. 6A is a perspective drawing view of inside case for view of internal modules for a Roll Out Touch Screen Support System.
Figure 6B:
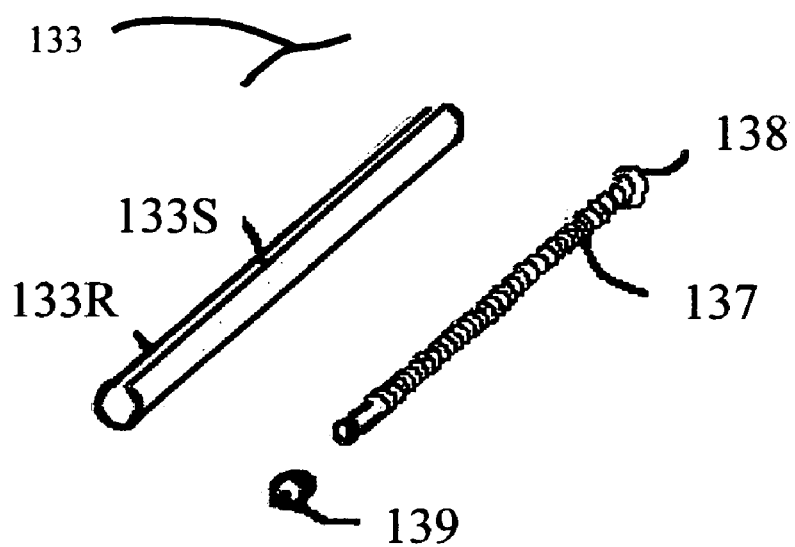
FIG. 6B is a perspective drawing of the internal roll up mechanism for a Roll Out Touch Screen Support System.

FIG. 6A is a perspective drawing of case with internal modules for a Roll Out Touch Screen Support System. Housing 101 is opened for internal viewing and screen mechanism is removed and shown to the left. The base of slot 103 is shown for descriptive purposes above electronics. Looking through view port 109 and opening on top a rectangular tension-retaring slot 135 in right end can be viewed. A left end support hole 134 for idler is shown dotted for discussion and visualization. Roll up mechanism 133 has corresponding spring retainer 138 (in the shape of a rectangular slot matched to fit into slot 135) on right end and a support pin 139 on left end (for mounting in hole 134). Handle retaining ends 108L and 108R are shown for visualization. A tensioning spring 137 (is shown without screen retainer tube 133R; FIG. 6B) when installed is meant to be preloaded to close screen 107 when not locked as in FIG. 4. Returning to FIG. 6A, modules to operate this embodiment are a battery 140, a power supply 141, a serial interface 143 (i.e. 1394 and/or USB module), an Input/Output panel 145 (for connectors), a radio interface 147 (i.e. 802.11a/b, Bluetooth, 1394 RF), a processor module 149, a digitizer 149D for determining pen position on screen, a memory module 149M for storing system information, and an OLED display driver 151 card (i.e. Kodak OLED driver kit). Typically, interface 147 would be bidirectional and include security encryption and similar precautions to prohibit incursions by undesirable parties.

FIG. 6B is a perspective drawing of the internal roll up mechanism 133. Roll up mechanism is disassembled to reveal a screen retainer tube 133R with a screen-mounting slot 133S. Tube 133R slides over spring 137 and pin 139 has a cap back that will engage tube 133R when assembled. Tension retainer 138 with tube 133R installed and support pin 139 will secure spring assembly and when installed in housing provide roll up tension when screen is deployed.

Figure 7:
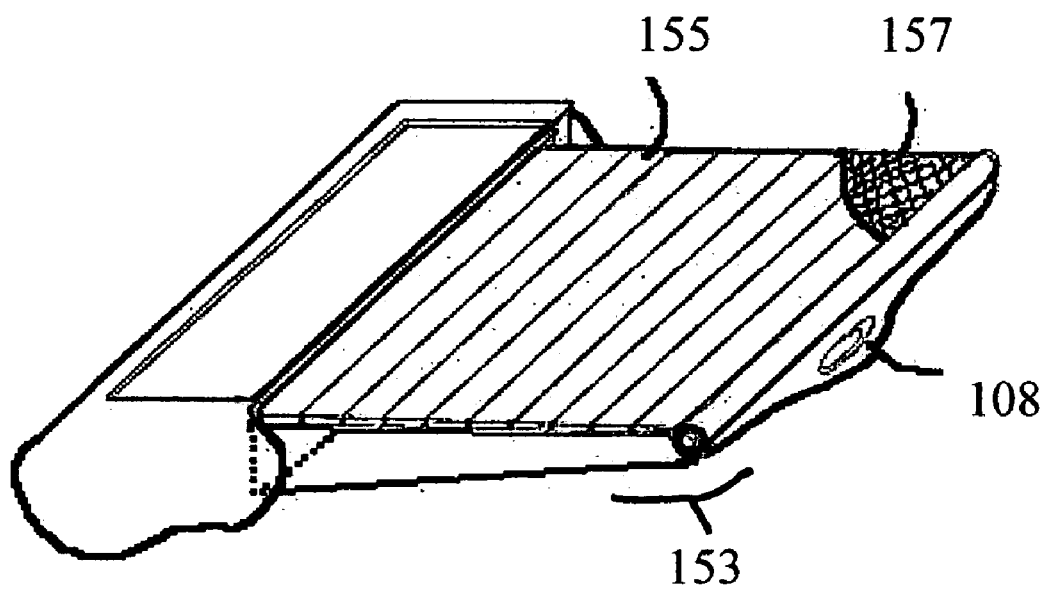
FIG. 7 is a perspective drawing of screen support for a Roll Out Touch Screen Support System.

FIG. 7 is a perspective drawing of screen support. A screen support mechanism 153 consists of a series of slats 155 arranged parallel to the housing. A portion of the slats 155 is shown removed in the upper right corner to reveal slats backing. Slats 155 are fashioned of plastic, wood or any material that provides lateral screen support with minimal size and weight are positioned closely together secured to a scrimshaw backing-webbing 157 with glue or similar adhesion method. Handle 108 is configured to guide mechanism 153 over arms and secure screens and slats when deployed and stowed. Slats 155 are shown to provide support and enable rolling up into housing.

FIG. 8A is a perspective drawing of screen 107 layers. Enhancements are shown for improved operator experience. An under-liner 161 is fashioned from such as silicone with mesh reinforcement to provide more complete isolation from slats 155. An optional liner sheet-backlight 163, fashioned from electro-luminescence material from MetroMark Minetonka, Minn. will provide backlighting for special requirements. An OLED screen 165 is available from Kodak, Philips Electronics, Samsung, or Universal Display Technologies. A touch screen 167 is shown examples are available from Touch Technologies or Universal Display Technologies. Alternatively, infrared or radio positioning touch systems will not require a physical screen, just x and y positioning sensors, available from TouchSystem in Hutto, Tex. or Cross technologies. Additionally, an optical pen touch system available from Toshiba/Matsushita can feature an optical sensor in a protective shield, these will minimize light loss from the OLED screen and minimize glare. A protective shield 169 is included for use in hazardous environments; a clear acetate, polymer sheet, or any non-opaque material will perform this function. Webbing 157 under slats 155 binds slats 155 into a structure. A set of straps 159 fashioned from elastic are shown, these are compensators for equalizing tension to top layer screen 167 and slats 155 as they will have different distances to travel when being deployed and stowed. The strap 159 is shown secured to screen 169 on right side and ready to secure to screen 169 on left side. Attachment of strap 159 underneath is shown in FIG. 8B. Depending on screen configuration whichever screen is on top can be used to attach straps 159.

FIG. 8B is a side view of roll up system and compensation. A basic version showing screen 167, screen 165, and slats 155 is shown extended from idler 139. Strap 159 is shown secured to screen 167 and underneath to slats 155 at attachment points 158 (×2, top and bottom, both sides) to provide tension compensation. Attachments can be with appropriate glue or pressed on with heat during assembly.

Figure 9:
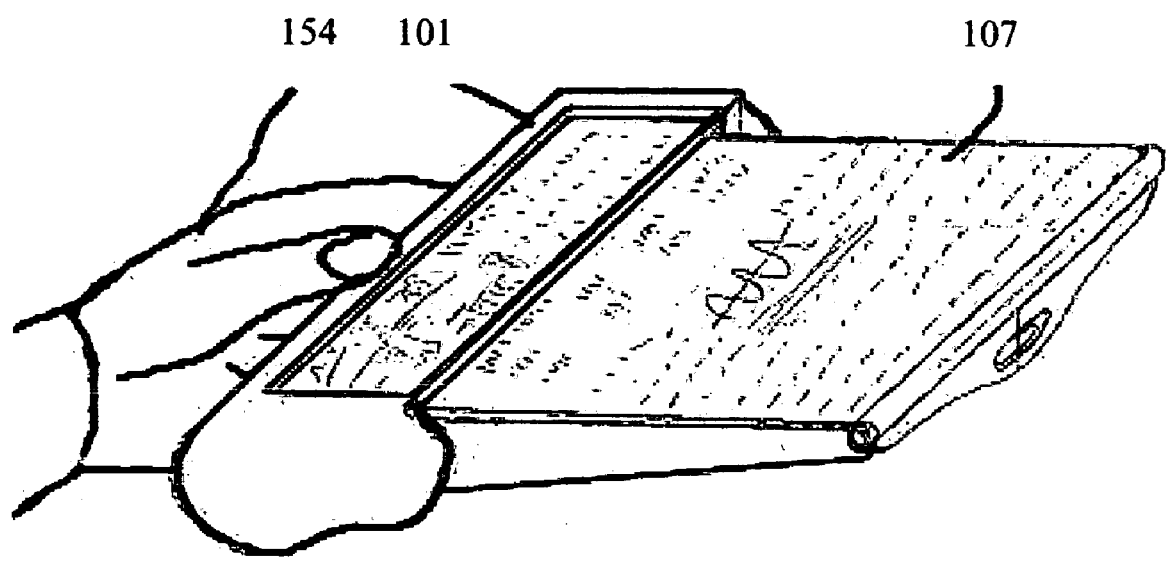
FIG. 9 is a perspective view of a Roll Out Touch Screen Support System held by an operator.

FIG. 9 is a perspective view of housing 101 with screen 107 extended while being held by an operator's hand 154. When the present invention is utilized in this manner operators are aided in performing tasks and can interact with a screen with the approximate dimensions of a laptop or tablet computer while transporting and carrying only a device the size of a PDA. The ability to view, type, or write on screen 107 while holding housing 107 affords the convenience of a rollout screen with the added capability of supported input without the need for an auxiliary table or stand.

FIG. 10A is a perspective view of a flexible arm attached to a Roll Out Touch Screen Support System. In this view housing 101 has an adapter mounting cup 170. Cup 170 is configured to allow an arm adapter 172 such as a male hose to female pipe adapter part # 8550-182 from www.cedarburg.com to rotate within cup 170 so arm will feature a variety of positions in relation to housing 101. Adapter 172 is pined with a pin 171 to cup 170. A flexible arm 174 is connected to adapter 172. Arm 174 can be comprised of an appropriate number of hose segments from www.cedarburg.com part # 8450-11 for the desired length. An arm termination adapter 176 is shown connected to arm 174 for connection to support base. Adapter 176 is another male hose to female pipe adapter part # 8550-182 from www.cedarburg.com.

FIG. 10B is a perspective view of a flexible support arm attached to a support to be belt mounted. The arm 174 is shown connected to adapter 176. Adapter 176 is shown mounted in an opening in belt base 178. Adapter 176 is pinned inside base 178 (not shown) and allowed to rotate ~110° from closed position. A location for a battery mount 179 is available for power to electronics in housing 101 or to power belt devices. When power is routed to housing 101 from base 178 the elements of arm 174 are hollow and small gauge power cables (typically containing capacity sufficient to power a PDA or cell phone) can be run inside arm 174.

FIG. 10C is a perspective view of a Roll Out Touch Screen Support System, flexible arm, and belt. A belt such as U.S. Pat. No. 6,137,675 is shown as belt 180. Base 178 is shown mounted on belt 180. Typically base 178 would slide over or clip to belt 180. Belt 180 has vertical structure that base 180 can attach to for stability and support of devices. A cantilevered arm such as arm 174 attached to base 178 will support housing 101, with and without screen deployed, and facilitate stable operator interaction.

Figure 11:
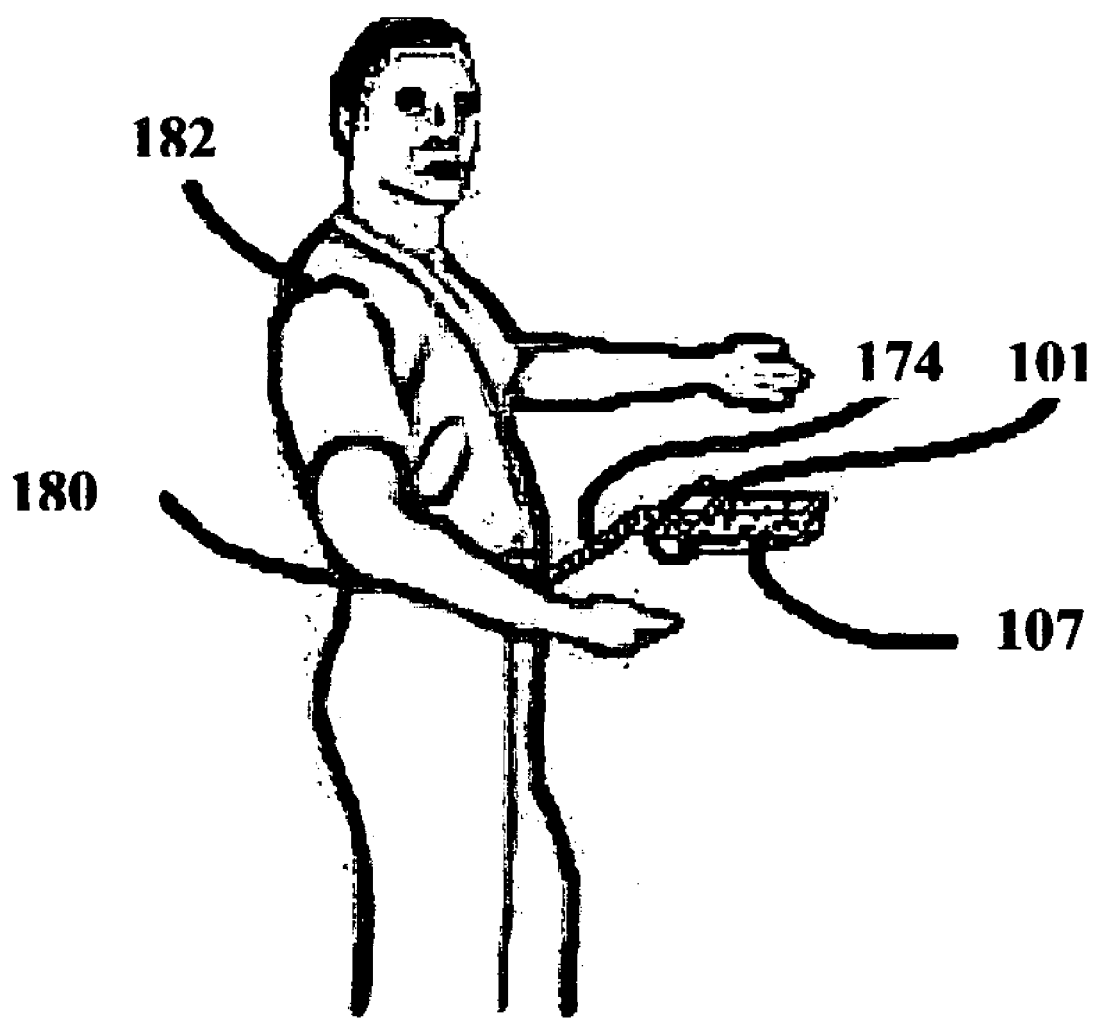
FIG. 11 is a view of a Roll Out Touch Screen Support System mounted on articulated arm of a wearable computer.

FIG. 11 is a view of a Roll Out Touch Screen Support System mounted on articulated arm of a wearable computer. An operator 182 is shown wearing a belt 180 with arm 174 and housing 101 with screen 107 deployed. Operator 182 is positioned to share information displayed on screen 107. Operator 182 has a choice of positions and can work with the display close in to allow privacy from prying eyes. The choice of operating positions and the ability to enjoy a screen the size of a laptop or tablet while working hands free is unique to the present invention. The touch capability of the system will facilitate operator (or others if operator desires) to enter or correct information while still being mobile. This capability is very important to operators who must go where the task is. For example a architect-operator that has to go on site to review a site problem can bring the drawings and correct or comment for "as built" realities. Additionally, the radio-internet communication capability of the present invention will assist operators to obtain, modify, or correct drawings from anywhere to anywhere. The camera function of the present invention can also assist in documenting "as built" situations. A conference call with video and drawings will not be difficult even from the site of the situation. Presently construction sites still suffer with red line drawings and slow corrections, costing millions of dollars annually. One practiced in the arts of site engineering should immediately see the potential benefit of this embodiment.

Figure 12:
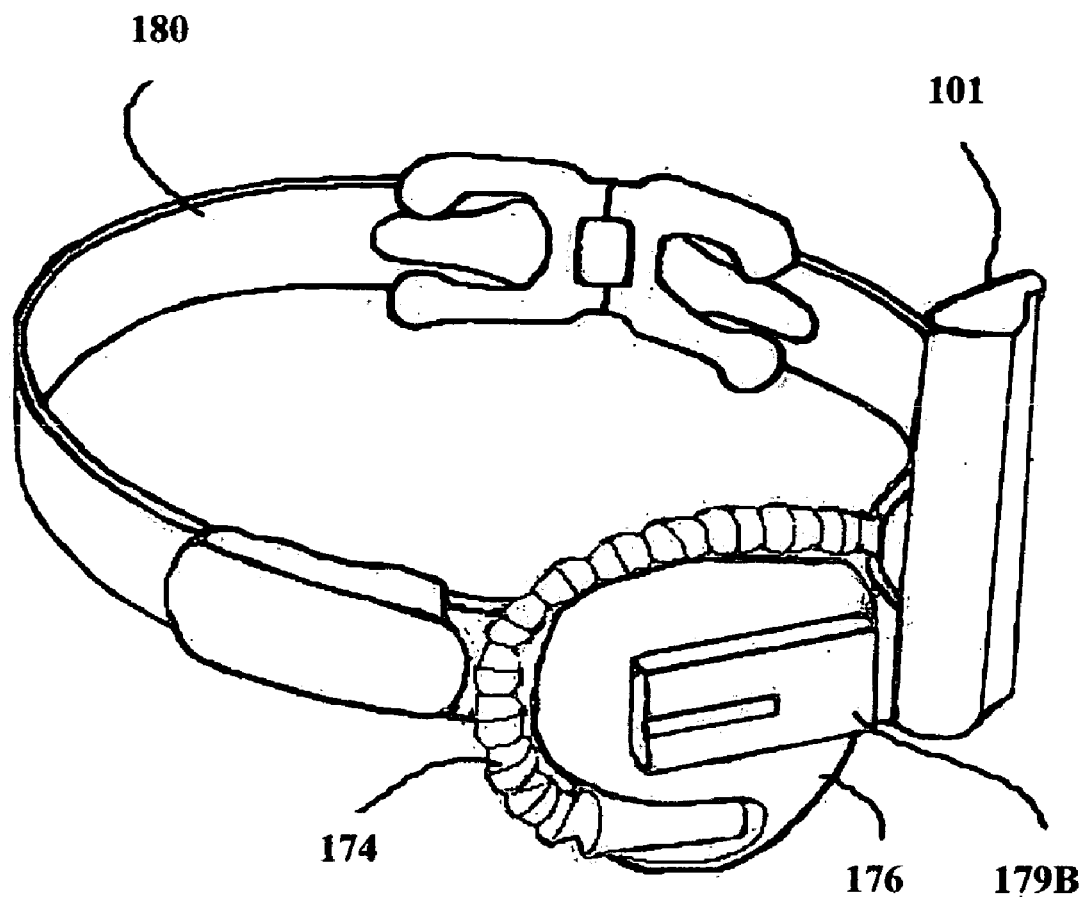
FIG. 12 is a view of a Roll Out Touch Screen Support System on a belt with arm folded for stowage.

FIG. 12 is a view of a Roll Out Touch Screen Support System on a belt with arm folded for stowage. Belt 180 is shown without a wearer (operator) for visualization. Mounted on belt 180 is base 176 with a battery 179B (in mount 179 FIG. 10b). Returning to FIG. 12, arm 174 mounted in base 176 and wrapped around perimeter of base 176 to minimize size and aide in transport and stowage when not in use. In this configuration a wearer can climb, or carry other devices to a difficult to reach site while bringing a generous display, net communications, and computational capability with an absolute minimum footprint and inconvenience.

Figure 13:
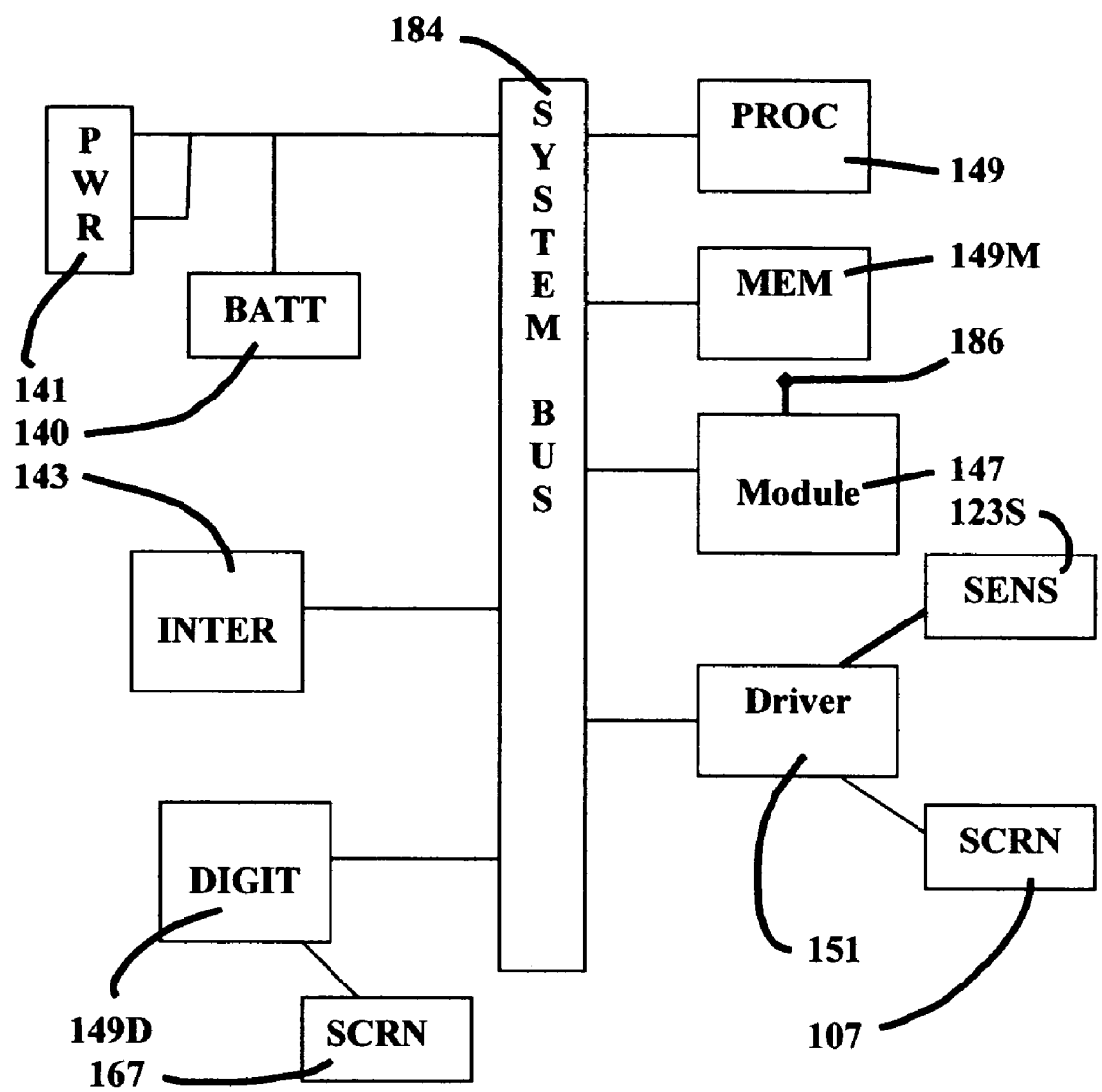
FIG. 13 is a block diagram of a Roll Out Touch Screen Support System.

FIG. 13 is a block diagram of a Roll Out Touch Screen Support System. A system bus 184 is shown to route and manage the data traffic of the roll out touch screen support system. Bus 184 receives power from supply 141 module and battery 140. Module 149 is shown as PROC block talking to bus 184. Module 149M, labeled MEM, is shown for the memory function talking to bus 184. Module 147 is shown talking to bus 184 and communicating with wireless services over an antenna 186. Driver 151 that is shown talking to bus 184 and driving screen 107. Sensor 123S is shown connecting screen position (determining size of display viewing area) information to driver 151. Digitizer 149D is shown talking to bus 184 and receiving touch position information from screen 167. Interface 143 is shown talking to bus 184 and facilitating input/output form local devices.

Figure 14:
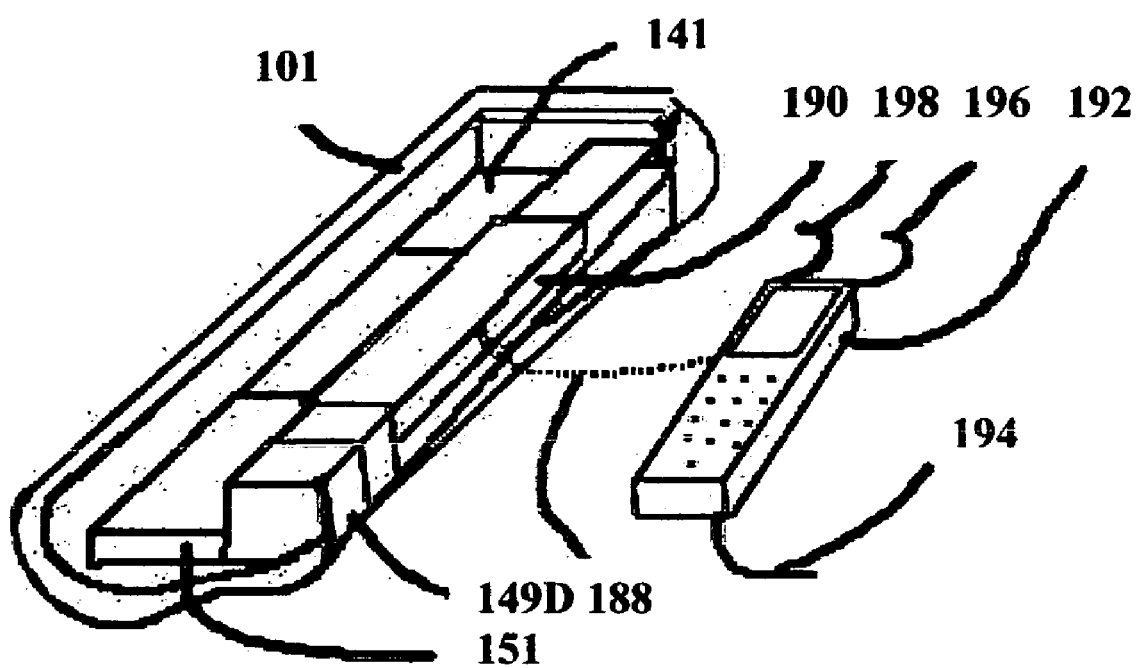
FIG. 14 is a view of a Roll Out Touch Screen Support System with a plug in communication device.

FIG. 14 is a view of a Roll Out Touch Screen Support System with a plug in communication device. In this embodiment housing 101 has space 190 made available with removal modules 147 and 149 (as shown in FIG. 6A). Returning to FIG. 14, this space is made available for a cell phone or PDA device 192 to replace the removed wireless and processor modules. By allowing for such devices to be inserted into the housing 101 the latest electronics can be utilized at the lowest costs and least time delay. A dotted line 188 shows where the device 192 goes into space 190. A power cable 198 is provided to connect device 192 to supply 141. A video out cable 196 is provided to connect device 192 to driver 151. A data cable 194 is provided to connect device 192 to module 149D.

Although the present invention has been explained in relation to its preferred embodiment, it is to be understood that many other possible modifications and variations can be made without departing from the spirit and scope of the invention as hereinafter claimed.

Advantages

From the above description a number of advantages or my Roll Out Touch Screen Support System (ROTS3) become evident:
(a) Interfaces for mobile operator without auxiliary support;
(b) Commenting and note taking for mobile operators is improved;
(c) Specific tasks can be scaled to specific screen size;
(d) Improved transportation when not in use;
(e) Personal digital assistant or cell phone basic functions available when screen is stowed;
(f) Long battery life with efficient power usage;
(g) Peripherals such as camera, speakers, microphone and others are supported;
(h) Flexible incorporation of advanced devices increases functionality and operator utility.

In addition ROTS3 compliments other technologies such as wearable computers for additional benefits Operation In operation one uses the ROTS3 as when pulling a paper towel from a roll or as a window shade. An Operator will partially view OLED screen and touch panel in the preferred embodiment when the screen is fully rolled up into the housing. This embodiment allows the operator to typical phone, calendar, and alert notification without deploying the screen. This minimal foot print configuration is for multi use devices such as a Personal Digital Assistant plus (PDA)/ cell phone (voice over IP or cell), camera when "rolled up". Touching the upper left area in FIG. 2 of port 109 will turn device on The plus part of this embodiment is the functionality made available when the flexible screen and touch panel are "rolled out".

Any flexible screen, membrane or similar sheets can be used over the ROTS3 to provide support anywhere without additional support or braces. Even rigid panels (for example; folding screens) may enjoy the configurable functionality of ROTS3 as applications are discovered. When as operator rolls out a screen with ROTS3 incorporated as in the preferred embodiment any function can be displayed and interacted without additional support.

When an operator completes the current task he/she may continue to the next task or roll up the ROTS3 and stow or monitor the closed configuration and enjoy the portable-functionality with out the inconvenience of such as a laptop computer. When an operator desires to change display orientation; two taps on the upper left area in FIG. 2 of port 109 will cause display to offer operator choice of landscape or portrait formats. Smaller foot prints for the ROTS3 housing are envisioned with any of the following made remote from the housing; PDA available when rolled up, processor/computer, battery, wireless and camera. Such an implementation can be connected to a host by Low Voltage Differential Signal, (LVDS), as a thin client or with IEEE 1394 type connection. In design for operation the ROTS3 system is intended to provide support for screens, touch devices, and any medium requiring a supportive backing.

Additional functionality for mobile individuals can be achieved by mounting ROTS3 housing on arm supported by U.S. Pat. No. 6,137,675. Such an arm on a structural belt will enhance ROTS3 support with hands free operation and transport.

Conclusions, Ramifications, and Scope

Accordingly, the reader will see that ROTS3 support of this invention can be used to improve the experience of operators engaged in performance of tasks. In addition, operators using ROTS3 have more freedom of movement as no auxiliary support is required. Furthermore, the simplified interface will make this technology used more often by operators. Additionally, scalability of the screen size will enhance the operator's experience as the operator deploys only the required size device. Further enhancing the operator's experience is the simplified transportation with the small footprint when screen is stowed. Additionally, basic functions are available to the operator in the stowed configuration. Efficient power usage will remove concern from operators or allow more functions for the same power. Embodiments also allow early leading development technology adapter devices such as PDAs and cell phone to be incorporated into the present invention. This embodiment will allow operators to have the greatest capabilities with the minimum time lag, at the lowest costs. As a bonus peripherals are supported and can be designed into the packaging. To further enhance the operator's experience ROTS3 can be combined with wearable computers and task performance can be further improved and transportation is almost invisible. The advantages and flexibility afforded by my ROTS3 can save operators time energy and improve productivity.

What is claimed is:

1. A mobile user computer interface device integrating peripheral modules within a unified housing implementing the ability to scale and functionally assign a deployable display screen with input support through a self contained position sensor, display driver, and processor operation for interfacing and interacting, screen stowed or deployed with communication networks and functional software comprising;
a mobile computer selectable display function,
a functionally assignable, rotatable display driver function, a unified housing contained mobile battery power function, a functionally assignable flexible display screen with a continually viewable auxiliary view port window function when screen is stowed, a set of rollable slats backing deployed screen support function, a pair of telescoping arms for seamless rollable slats input backing support function: and a tensioned screen and backing roll up mechanism function.

2. A mobile user computer interface device according to claim 1 wherein; the functionally assigned device is housed in a protective case.

3. A mobile user computer interface device according to claim 1 wherein; the tensioned roll up mechanism and input backing support system is assembled to retract the display screen into the protective case when not desired to be deployed.

4. A mobile user computer interface device according to claim 1 wherein; the input backing support system includes a deployable roll up capability and seamless lateral support for the display screen.

5. A mobile user computer interface device according to claim 1 wherein; the backing support system is comprised of parallel slats constrained by a flexible structural backing.

6. A mobile user computer interface device according to claim 1 wherein; the telescoping support includes a deployable support function with vertical support for display screen and input backing support.

7. A mobile user computer interface device according to claim 1 wherein; the telescoping input backing support function includes a pair of position locking slots to secure display screen and input backing support in deployed position.

8. A mobile user computer interface device according to claim 1 wherein; the deployable telescoping backing support function includes multiple screen and input backing support size locking positions.

9. A mobile user computer interface device according to claim 1 wherein; the deployable telescoping input backing support function includes a sensor function to inform the display driver of operator desired screen size.

10. A mobile user computer interface device according to claim 1 wherein; the deployable display input support and flexible display screen is a functionally integrated interface device using an organic light emitting diode screen.

11. A mobile user computer interface device according to claim 1 wherein; the deployable flexible display screen, touch screen, and input backing support comprise a rollable display screen system.

12. A mobile user computer interface device according to claim 1 wherein; the mobile computer interfaces the devices native processing power to a communication function through a bidirectional radio interface for network.

13. A mobile user computer interface device according to claim 1 wherein; the mobile computer native processing power communicates through a bidirectional radio interface with security provisions.

14. A mobile user computer interface device according to claim 1 wherein; the deployable flexible display screen has an input function that is accomplished through a flexible touch screen with input backing support that stows and deploys with display screen and input backing support for data entry.

15. A mobile user computer interface device according to claim 1 wherein; the deployable touch screen incorporating assignable display drivers functions as a virtual keyboard.

16. A mobile user computer interface device according to claim 1 wherein; the deployable touch screen incorporating assignable display drivers functions as a drawing input device for remote input.

17. A mobile user computer interface device according to claim 1 wherein; the deployable touch screen function is accomplished by a radio positioning touch location of pen input.

18. A mobile user computer interface device according to claim 1 wherein; the deployable touch screen function is accomplished by an optical sensor.

19. A mobile user computer interface device according to claim 1 wherein; the deployable display function is rotateable for operator choice of presentations.

20. A mobile user computer interface device according to claim 1 wherein; integration and structural input support of electronic peripherals is mounted on an articulated arm of a wearable computer.

21. A mobile user computer interface device according to claim 1 wherein; a platform for leading screen display development technologies is provided for integration of advanced display capabilities.

22. A method of supporting a mobile user computer interface device integrating peripherals within a unified housing implementing the ability to scale and functionally assign a deployable display support apparatus which comprises;

implementing a functionally integrated Mobile computer, presenting with an assignable, rotatable display driver, incorporating assignable display drivers, powering the unified housing self-contained Battery power, affording viewing through a configurable flexible display screen with an auxiliary, functionally assignable view port window, supporting the screen inputs through a seamless lateral backing support, further supporting through a pair of Telescoping arms, and implementing a tensioned screen roll up mechanism.

23. The method of supporting a mobile user computer interface of claim 22 wherein; input display supporting is provided by an assembly of slats, backings, and arms for a flexible screen.

24. The method of supporting a mobile user computer interface of claim 22 wherein: implementing a mobile user interface with functionally integrated deployable display support apparatus incorporating assignable drivers includes mounting on an articulated arm of a wearable computer.

* * * * *